United States Patent Office

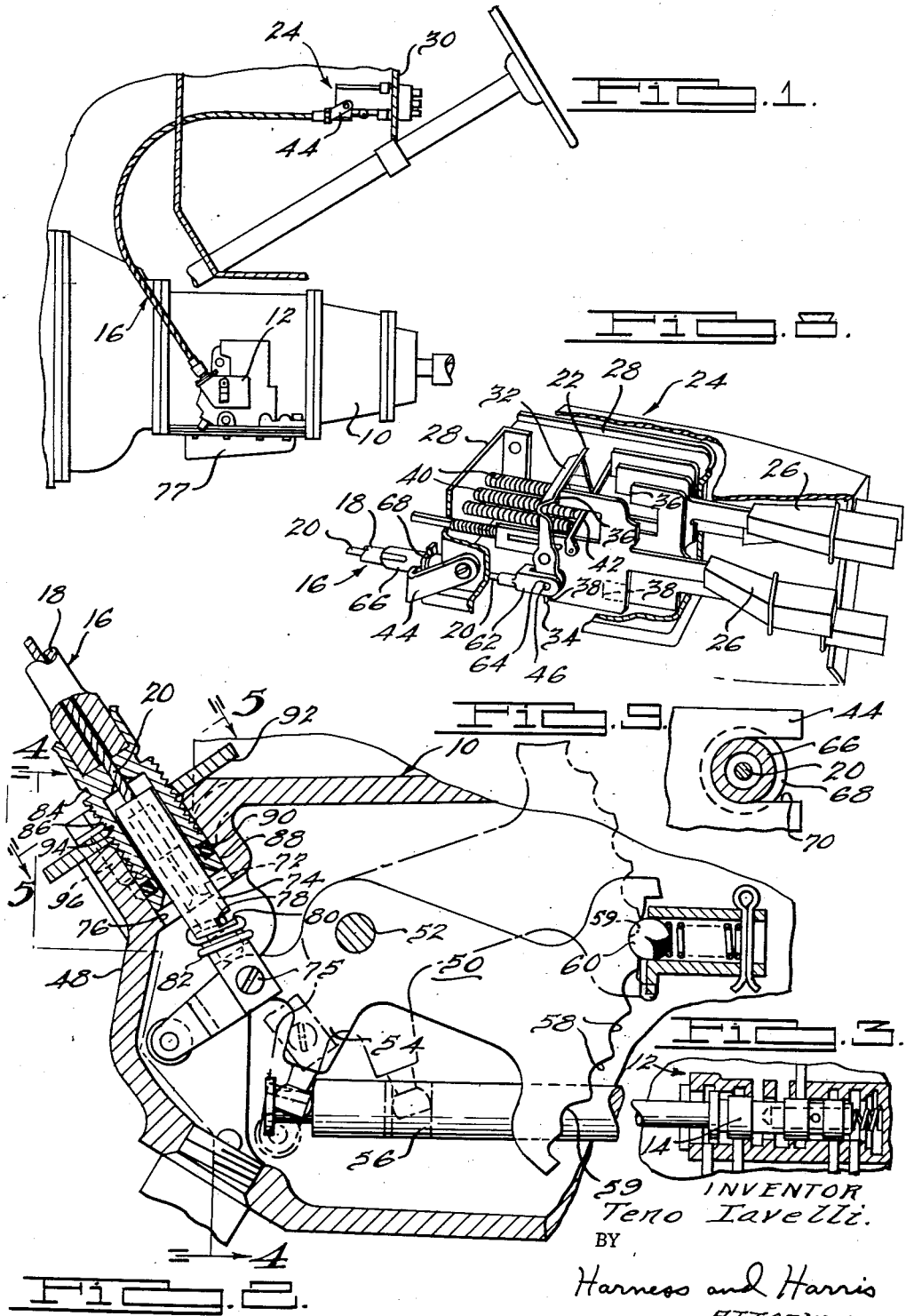

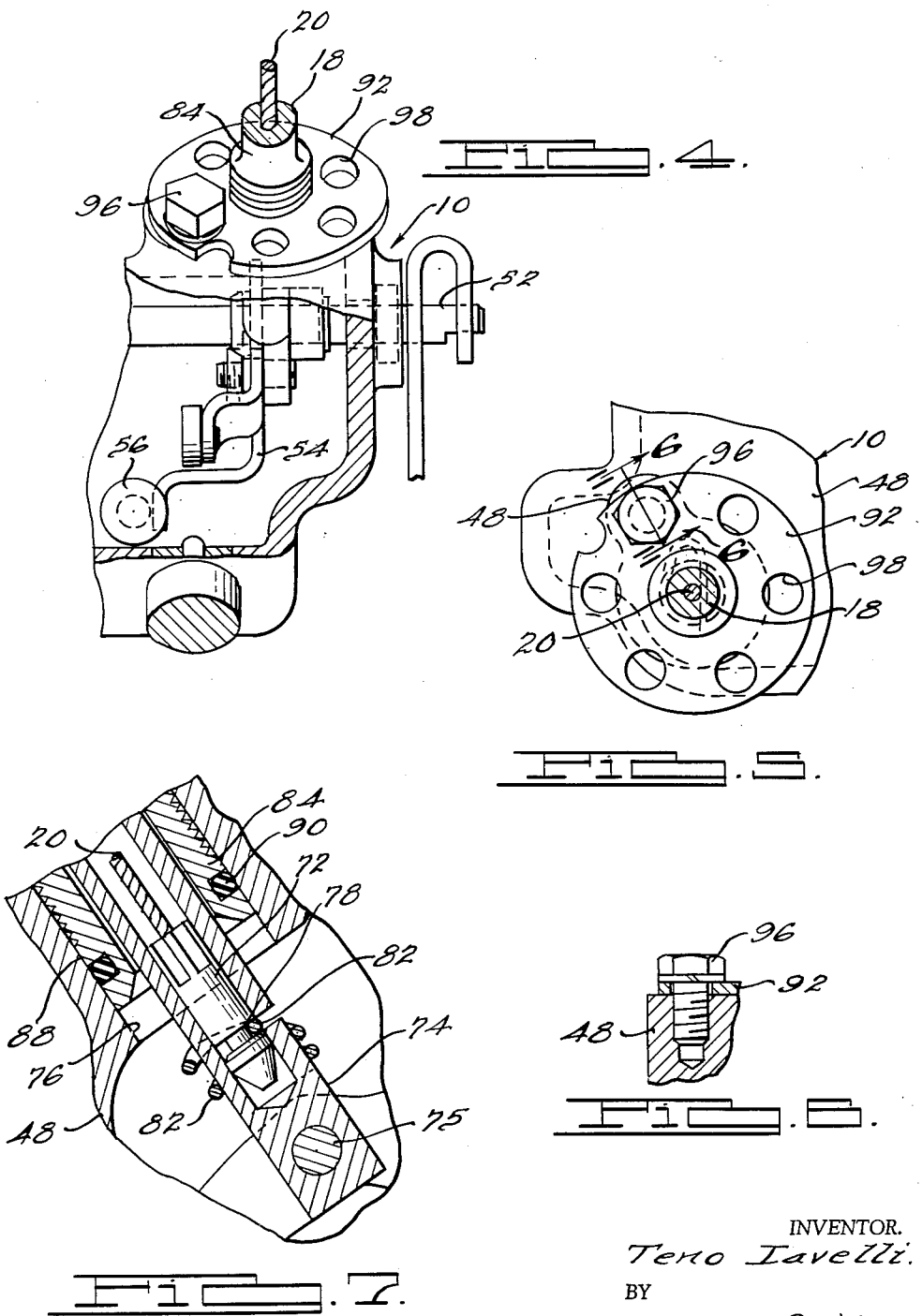

2,989,877
Patented June 27, 1961

1

2,989,877
ADJUSTABLE CABLE MOUNTING
Teno Iavelli, Detroit, Mich., assignor to Chrysler Corporation, Highland Park, Mich., a corporation of Delaware
Filed Nov. 28, 1958, Ser. No. 777,087
5 Claims. (Cl. 74—501)

This invention relates to a transmission control mechanism and more particularly to an adjustable mounting for a transmission control cable.

The copending application, Serial No. 530,528 filed August 25, 1955, now abandoned by Alan G. Loofbourrow and James R. McCordic discloses a push button control for an automatic transmission in which a plurality of selectively operable elements, such as push buttons, may be manually actuated to position a transmission control valve in a plurality of stations by means of a single cable forming an operative connection therebetween. The invention herein described constitutes an improvement on the devices disclosed in the aforementioned copending application, and in the patent to James R. McCordic et al. No. 2,847,874, which is an improvement over the device of the aforementioned copending application Serial No. 530,528.

It is desirable in the commercial production of automobiles or other devices incorporating the control apparatus of the type to be described herein to provide preformed fittings on the ends of the control cable and cooperating fittings on a first part associated with the aforementioned selectively operable elements and on a second part associated with the transmission control valve. The above mentioned preformed fittings impart a predetermined length to the cable and in themselves are desirable because they facilitate rapid assembly, but they have a disadvantage in that they provide no means to compensate for variations in the distance between the above mentioned first and second parts which occurs in different commercially produced devices. Although the distance between the above mentioned first and second parts may vary slightly in different installations their relative positions must not vary for they determine the positions of the transmission control valve.

It is a principal object of this invention to provide means to mount the above mentioned cable such that when the said fittings are being secured to the first and second parts the effective length of the cable may be altered to compensate for any departure from the desired distance between said first and second parts.

In the drawings:

FIGURE 1 is a side elevational view showing the apparatus associated with an automobile transmission;

FIGURE 2 represents a view partly in cross section of the actuating linkage for the control valve and cable mounting embodying the present invention;

FIGURE 3 represents a cross sectional view of the control valve;

FIGURE 4 represents a view partly broken away of the cable mounting and control valve taken along the line 4—4 of FIGURE 2 in the direction of the arrow;

FIGURE 5 represents an elevational view of the cable mounting taken along the line 5—5 of FIGURE 2;

FIGURE 6 represents a view of the cable mounting securing means taken along the line 6—6 of FIGURE 5;

FIGURE 7 represents an enlarged view of the connection between the control cable and the control valve actuating linkage;

FIGURE 8 represents a view partly broken away of the driver operated push button device; and FIGURE 9 represents an end view of the cable supporting bracket in FIGURE 8.

The apparatus to be described herein is adapted for use in combination with transmission control apparatus of the type illustrated and described in Jeremy T. Ball patent application Serial No. 477,870 filed December 27, 1954 now Patent No. 2,932,977. The transmission described in the above mentioned Jeremy T. Ball application is representative of some commercial transmission to the extent that a hydraulic control system for the transmission is regulated by movement of a single valve. The transmission is shown in FIGURE 1 and designated by the numeral 10 and the valve referred to is designated by the numeral 12 in FIGURE 3.

The valve 12 includes a slidable valve operating member 14 which may be selectively positioned at different stations respectively corresponding to different transmission operating conditions. The valve operating member 14 is operatively connected, through a mechanism to be described herein, to a cable 16. The cable 16 includes an outer sheath 18 and an inner control element 20 with the inner control element operatively connected to an output member 22 of a driver operated push button device 24.

The driver operated push button device 24 is more completely described in the copending application of Alan G. Loofbourrow and James R. McCordic, Serial No. 530,528, which was filed August 25, 1955, now abandoned, and it includes a plurality of selectively operable push buttons 26 which are slidably mounted in a support 28 and which are adapted to position the output member 22 in a plurality of operating stations. The push button device is preferably mounted on an instrument panel 30 of the motor vehicle and referring to FIGURE 8 it will be noted that, as described in the above mentioned copending application Serial No. 530,528, the output member 22 is rotatably mounted on the support 28. The output member 22 includes upper and lower transversely extending portions 32 and 34 and the push buttons 26 each carry a pair of cooperating cam surfaces 36 and 38 which are adapted to strike the upper and lower transversely extending portions 32 and 34 of the output member 22 to predetermine the angular position which the output member 22 will assume when a particular push button 26 is depressed. The cam surfaces 36 and 38 have slightly different relative spacing of the respective push buttons 26 so that no two of the push buttons 26 dictate the same angular position of the output member 22 and the spacing of the cam surfaces 36 and 38 on the push buttons is preselected so that the angular positions assumed by the output member 32 in response to selective operation of the individual push buttons causes adequate movement of the valve operating member 14 to establish a selected transmission condition. Suitable springs 40 extend between the respective push buttons 26 and the support 28 to return the push buttons and a latching device 42 is utilized to retain a depressed push button in contact with the output member 22 until subsequently released by depression of another push button as described in the above mentioned copending patent application Serial No. 530,528.

The cable 16 is preferably of the Bowden wire type and its outer sheath 18 is secured to the support 28 through a bracket 44 while its inner control element 20 is secured by a pin 46 to the output member 22. The other end of the cable 16 extends to the transmission 10 and the outer sheath 18 of the cable is fixed to the outer casing 48 of the transmission 10 while the inner control element 20 penetrates the casing 48 and extends into the interior of the transmission.

A lever plate 50 is rotatably mounted within the transmission on a vertically extending shaft 52 and is provided with a laterally extending finger 54 which in turn is connected by a link 56 to the slidable valve operating member 14. As previously mentioned herein the slidable valve operating member 14 is adapted to control the hydraulic control system of a transmission in the manner described in Jeremy T. Ball patent application, Serial No. 477,870 which was filed December 27, 1954 and reference may be made thereto for a description of the hydraulic control system and the operative components of the transmission 10.

The rotatable lever plate 50 is preferably provided with a plurality of serrations 58 which are engaged by a spring detent mechanism 60 to retain the lever plate 50 in predetermined positions corresponding to different stations of the valve operating member 14. The inner control element 20 of the cable 16 is secured to the lever plate 50, in a manner to be described herein, so that positioning of the valve operating member 14 occurs as an incident to selective depression of a push button 26 by reason of the fact that the cooperating cam surfaces 36 and 38 of the selected push button predetermine the position assumed by the output member 22 which, in turn moves the inner control element 20 of the cable 16 to a selected position relative to its outer sheath 18 and this causes rotation of the lever plate 50 and simultaneous positioning of the slidable valve operating member 14. It will be seen that the particular movements imparted to the cable inner control element 20 by selective operation of the push buttons must be coordinated with the stations which the lever plate 50 should assume, under the control of the spring detent mechanism 60, so that an exact positioning of the valve operating member 14 will occur in response to an actuation of each of the push buttons 26.

In order that expensive and time consuming trial and error adjustments will not be necessary in the assembly of each automobile including the control mechanism described herein a novel means has been provided to accommodate rapid assembly of the parts and compensation for any slight dimensional variations which might occur in different vehicles. The cable is provided with an unsupported portion of bowed configuration intermediate its ends which contributes to the installation and adjustment thereof. At one end of the cable 16 the inner control element 20 has a preformed clevis fitting 62 permanently secured thereto and the fitting 62 is provided with an opening 64 which is adapted to be penetrated by a pin 46 to secure the cable inner control element to the output member 22. The corresponding end of the outer sheath 18 is provided with a fitting 66 which has an annular groove 68. The bracket 44 which is carried by the support 28 is slotted at 70 as indicated in FIGURE 9 and the depth of the groove 68 is predetermined so that the fitting 66 may be assembled on the bracket 44 by inserting the groove 68 in the slot 70. It will thus be seen that the provision of predetermined fittings at one end of the cable accommodates rapid assembly of the cable to the push button device 24. No provision for adjustment has yet been described, however.

The inner control element 20 of the cable 16 at its lower or other end is provided with a fitting 72. The lever plate 50 carries a cooperating fitting 74 which is bolted to the lever plate 50 by bolt means 75. Fitting 74 is hollow and adapted to be aligned with an opening or socket means 76 provided in the casing 48 of the transmission 10. The transmission casing 48 carries a pan 77 which may be removed to accommodate manual alignment of fitting 74 with opening 76. The fitting 74 is adapted to be axially penetrated by the fitting 72 and the fitting 72 has an annular groove 78 while the fitting 74 has a partial annular slot 80. A spring clip 82 is snapped over the fitting 74 with a portion of the clip 82 penetrating into the interior of the hollow fitting 74 by reason of the slot 80. It will be seen that in assembly the cable 16 may be pushed through the opening 76 in the transmission casing 48 until the fitting 72 penetrates the hollow fitting 74 sufficiently for the spring 82 to snap into the groove thereby establishing an operative connection between the cable inner control element 20 and the lever plate 50 (see FIGURE 7).

The outer sheath 18 of the cable 16 must also be secured relative to the transmission and since each of the fittings which have heretofore been described are preformed on the cable it will be seen that a provision for adjustment is necessary in the event that the lever plate 50 might be a slightly different distance from the output member 22 in different assembled automobiles. This adjustment is obtained by reason of the fact that when the cable penetrates the transmission casing 48 and the fitting 72 is forced into the fitting 74 until it passes under the spring 82 it effectively forces the lever plate 50 and valve operating member 14 to the extreme position illustrated by the dotted lines in FIGURE 2 where the spring detent mechanism engages the last serration 59 on the lever plate 50. If the corresponding push button 26 is depressed at that time so that the output member 22 of the push button device 24 is positioned in the position corresponding to the extreme position of the lever plate 50 it will be established that the proper relative positions exist between the output member 22 and the lever plate 50. However, it is then necessary to secure the outer sheath 18 to the transmission 10 and therein the adjustment occurs for the unsupported intermediate bowed portion of the cable permits considerable latitude in positioning the fitting 72 of the cable inner control element in its proper position in fitting 74 on the lever plate 50.

Referring to FIGURE 2, an adjustment means 84 having threads or adjustment projections 86 thereon is secured to the adjustment end of sheath 18 and is adapted to be moved in and out of socket means 76 in housing 48. An inner portion 88 of means 84 is smooth to provide a bearing means, and also contains a sealing ring 90 to prevent transmission fluid leakage through opening 76. Referring to FIGURES 4 and 5, a locating means 92 having threads 94 thereon mating with threads 86 of means 84 is adapted to be adjustably threaded on said means 84 and to abut and be secured to housing 48 by locking means 96 to position and fix means 84 in socket 76.

In utilizing adjustment means 84, control element 20 is fixed to member 22 and sheath 18 is fixed to housing 28 of the push button device 24. The push button associated with the notch 59 of lever 50 is then pushed in, and sheath 18 and element 20 supported thereby at close tolerances are inserted into socket 76 to cause fitting 72 to snap under spring 82 and to cause lever 50 to rotate counterclockwise on pivot 52 to its limit shown by the dotted lines in FIGURE 2. At this point, locating means 92 is screwed down to abut housing 48 to temporarily fix the sheath 18 and element 20 relative to device 24, housing 48, and lever 50. Member 92 is then further screwed down on means 84 a predetermined partial turn to back sheath 18 slightly out of socket 76 and off of element 20 at their points of frictional contact. Bolt holes 98 in member 92 allow precise degrees of rotation of member 92 and exact location of sheath 18 to be made. When this rotation is completed, locking means 96 is threaded into housing 48 (see FIGURE 6) to fix members 92 and 84 therein.

I claim:

1. In a control system for a transmission having a housing with an adjustable valve means and movable lever means therein for adjusting the same, socket means in said housing, manually operable control means for actuating said lever means, a movable control element extending through said socket means into said housing and connecting said lever means to said control means, a flexible sheath enclosing said control element and providing bearing means therefor, means securing one end of said sheath against movement relative to said control means and said lever means, adjustment means on the other end of said sheath adapted for insertion into said socket means, adjustment projections on said adjustment means, and locating means on said housing adapted to selectively engage said adjustment projections to locate said adjustment means at a desired position in said socket means, said locating means being movable on said housing to a plurality of indexing positions to selectively move said adjustment means within said socket means to a plurality of positions.

2. In a control system for a transmission having a housing with an adjustable valve means and movable lever means therein for adjusting the same, socket means in said housing, manually operable control means, a movable control element extending through said socket means into said housing and connecting said lever means to said control means, a flexible sheath enclosing said control element and providing bearing means therefor, means securing one end of said sheath against movement relative to said control means and said lever means, adjustment means on the other end of said sheath adapted for insertion into said socket means, adjustment threads on said adjustment means, and locating means movably mounted on said housing and having mating threads adapted to selectively engage said adjustment threads, said locating means being selectively movable to a plurality of indexing positions to locate said adjustment means at a plurality of positions in said socket means.

3. In a control system for a transmission having a housing with an adjustable valve means and movable lever means therein for adjusting the same, a transmission control device, manually operable control means movably mounted in said control device, a movable control element extending into said housing and connecting said lever means to said control means, flexible bearing means enclosing and slidably supporting said control element, means securing one end of said bearing means in a predetermined position with respect to said lever means and said control device, socket means in said housing slidably receiving the other end of said bearing means, adjustment projections on said bearing means adjacent the other end thereof, and adjustable locating means on said housing adapted to be moved to a plurality of indexing positions on said housing to selectively engage said adjustment projections to selectively locate said other end of said bearing means and said control element supported thereby in a plurality of positions with respect to said device, transmission, and lever means.

4. In a control system for a transmission having a housing with an adjustable valve means and movable lever means therein for adjusting the same, a transmission control device, manually operable control means movably mounted in said control device, a movable control element extending into said housing and connecting said lever means to said control means, flexible bearing means enclosing and slidably supporting said control element, means securing one end of said bearing means in a predetermined position with respect to said lever means and said control device, socket means in said housing slidably receiving the other end of said bearing means, adjustment threads on said bearing means adjacent the other end thereof, and angularly adjustable locating means on said housing movable selectively to a plurality of indexing positions and having mating threads adapted to selectively engage said adjustment threads to selectively locate said other end of said bearing means and said control element supported thereby in a plurality of positions with respect to said device, transmission, and lever means.

5. In a control system for a transmission having a housing with an adjustable valve means and movable lever means therein for adjusting the same, a transmission control device, manually operable control means movably mounted in said control device, a movable control element extending into said housing and connecting said lever means to said control means, flexible bearing means enclosing and slidably supporting said control element, mean securing one end of said bearing means in a predetermined position with respect to said lever means and said control device, socket means in said housing slidably receiving the other end of said bearing means, adjustment threads on said bearing means adjacent the other end thereof, and angularly adjustable locating means on said housing selectively movable to each of a plurality of positions on said housing and having mating threads adapted to selectively engage said adjustment threads to selectively locate said other end of said bearing means and said control element supported thereby in desired relationship with respect to said device, transmission and lever means, and locking means on said housing engaging said locating means to secure said locating means against movement relative to said housing.

References Cited in the file of this patent

UNITED STATES PATENTS

| | | |
|---|---|---|
| 149,362 | Watrous | Apr. 7, 1874 |
| 1,292,707 | Clark | Jan. 28, 1919 |
| 1,382,741 | Pierson | June 28, 1921 |
| 2,149,754 | Whiteford | Mar. 7, 1939 |
| 2,847,874 | McCordic et al. | Aug. 19, 1958 |

FOREIGN PATENTS

| | | |
|---|---|---|
| 243,041 | Great Britain | Nov. 18, 1925 |
| 293,541 | Great Britain | July 12, 1928 |
| 810,776 | France | Jan. 6, 1937 |